US008992640B2

(12) United States Patent
Khosravian et al.

(10) Patent No.: US 8,992,640 B2
(45) Date of Patent: Mar. 31, 2015

(54) ENERGY RECOVERY IN SYNGAS APPLICATIONS

(75) Inventors: Khodaram Rustom Khosravian, Sugar Land, TX (US); Ronald Frederick Tyree, Richmond, TX (US); Patrick Joseph McKenna, Houston, TX (US)

(73) Assignee: General Electric Company, Schenectady, NY (US)

( * ) Notice: Subject to any disclaimer, the term of this patent is extended or adjusted under 35 U.S.C. 154(b) by 1089 days.

(21) Appl. No.: 13/022,553

(22) Filed: Feb. 7, 2011

(65) Prior Publication Data

US 2012/0198768 A1    Aug. 9, 2012

(51) Int. Cl.
| | |
|---|---|
| *C10J 1/207* | (2012.01) |
| *B01J 7/00* | (2006.01) |
| *C01B 3/32* | (2006.01) |
| *C10J 3/46* | (2006.01) |
| *C10K 1/10* | (2006.01) |
| *C10K 3/04* | (2006.01) |

(52) U.S. Cl.
CPC ...... *C10J 3/466* (2013.01); *Y02E 20/14* (2013.01); *Y02E 20/18* (2013.01); *C10K 1/101* (2013.01); *C10K 3/04* (2013.01); *C10J 2300/0906* (2013.01); *C10J 2300/1606* (2013.01); *C10J 2300/165* (2013.01); *C10J 2300/1653* (2013.01); *C10J 2300/1675* (2013.01); *C10J 2300/1678* (2013.01); *C10J 2300/169* (2013.01); *Y02E 20/16* (2013.01)
USPC ............ 48/76; 48/61; 48/127.9; 48/127.1; 48/69; 48/70; 48/71; 48/72; 48/73; 48/200; 48/201; 48/202; 48/203; 48/204; 48/75; 48/63; 48/98; 48/99; 48/101; 48/93; 48/94; 48/198.3; 48/198.8

(58) Field of Classification Search
USPC ............ 48/61, 127.9, 127.1, 76, 69, 72–74, 48/200–202
See application file for complete search history.

(56) References Cited

U.S. PATENT DOCUMENTS

| | | |
|---|---|---|
| 3,699,938 A | 10/1972 | Frazier |
| 5,003,782 A | 4/1991 | Kucerija |

(Continued)

FOREIGN PATENT DOCUMENTS

| | | |
|---|---|---|
| CN | 1101890 A | 4/1995 |
| CN | 1216322 A | 5/1999 |

(Continued)

OTHER PUBLICATIONS

Depuy et al; Article Entitled Lower Cost of Electricity Using IGCC with GE's 9H Gas Turbine; Presented at the 1999 Gasification Technologies Conference; pp. 1-18.

(Continued)

*Primary Examiner* — Kaity Handal
(74) *Attorney, Agent, or Firm* — Fletcher Yoder, P.C.

(57) ABSTRACT

The disclosed embodiments include systems for using an expander. In a first embodiment, a system includes a flow path and a gasification section disposed along the flow path. The gasification section is configured to convert a feedstock into a syngas. The system also includes a scrubber disposed directly downstream of the gasification section and configured to filter the syngas. The system also includes a first expander disposed along the flow path directly downstream from the scrubber and configured to expand the syngas. The syngas comprises an untreated syngas.

15 Claims, 4 Drawing Sheets

(56) References Cited

U.S. PATENT DOCUMENTS

| | | | |
|---|---|---|---|
| 5,403,366 A | 4/1995 | Leininger et al. | |
| 5,699,267 A | 12/1997 | Batson et al. | |
| 5,715,671 A | 2/1998 | Griffiths | |
| 6,033,456 A * | 3/2000 | Jahnke | 75/505 |
| 6,061,936 A | 5/2000 | Jahnke | |
| 6,149,859 A | 11/2000 | Jahnke et al. | |
| 6,233,916 B1 | 5/2001 | Anand et al. | |
| 7,503,947 B2 | 3/2009 | Barnicki | |
| 7,739,875 B2 | 6/2010 | Bartlett | |
| 8,247,462 B2 | 8/2012 | Boshoff et al. | |
| 2006/0096298 A1 | 5/2006 | Barnicki et al. | |
| 2009/0071166 A1* | 3/2009 | Hagen et al. | 60/775 |
| 2009/0158701 A1 | 6/2009 | Hoffmann et al. | |
| 2010/0051876 A1 | 3/2010 | Filippi et al. | |
| 2010/0143225 A1* | 6/2010 | Serban et al. | 423/226 |
| 2010/0179232 A1* | 7/2010 | Robinson et al. | 518/703 |
| 2010/0219881 A1 | 9/2010 | Chen et al. | |
| 2010/0325956 A1 | 12/2010 | Dinu et al. | |
| 2011/0162276 A1* | 7/2011 | Mishra et al. | 48/73 |
| 2011/0162278 A1* | 7/2011 | Depuy et al. | 48/62 R |
| 2011/0259014 A1* | 10/2011 | Miller et al. | 60/772 |
| 2011/0277385 A1* | 11/2011 | Mazumdar et al. | 48/77 |
| 2011/0277860 A1* | 11/2011 | Mazumdar et al. | 137/565.01 |
| 2012/0005959 A1* | 1/2012 | Chen et al. | 48/61 |
| 2012/0037732 A1* | 2/2012 | Stevenson et al. | 239/600 |

FOREIGN PATENT DOCUMENTS

| | | |
|---|---|---|
| CN | 101331212 A | 12/2008 |
| CN | 101663376 A | 3/2010 |
| PL | 139256 B1 | 5/1988 |
| PL | 391696 A1 | 6/2010 |
| PL | 209150 B1 | 7/2011 |
| WO | WO9914473 | 3/1999 |
| WO | 2012009783 A1 | 1/2012 |

OTHER PUBLICATIONS

Polish Search Report dated May 17, 2012 from corresponding PL Application No. P398023.

Unofficial English Translation of Chinese Office Action issued in connection with corresponding CN Application No. 201210035843.6 on Jun. 18, 2014.

* cited by examiner

ENERGY RECOVERY IN SYNGAS APPLICATIONS

BACKGROUND OF THE INVENTION

The subject matter disclosed herein relates to the recovery of energy in industrial applications and, more specifically, to the recovery of energy in syngas applications.

Feedstock, such as coal, petroleum coke, biomass, wood-based materials, agricultural wastes, tars, coke oven gas and asphalt, or other carbon containing items may be gasified for use in the production of electricity, chemicals, synthetic fuels, or for a variety of other applications. Gasification involves reacting a carbonaceous fuel and oxygen at a very high temperature to produce syngas, a fuel containing carbon monoxide and hydrogen, which burns much more efficiently and cleaner than the fuel in its original state. The syngas may be used for power generation, chemical production, or any other suitable application. However, the production of syngas may result in certain inefficiencies, thus wasting energy.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a flow path and a gasification section disposed along the flow path. The gasification section is configured to convert a feedstock into a syngas. The system also includes a scrubber disposed directly downstream of the gasification section and configured to filter the syngas. The system also includes a first expander disposed along the flow path directly downstream from the scrubber and configured to expand the syngas. The syngas comprises an untreated syngas.

In a second embodiment, a system includes a flow path and a first fluid source disposed along the flow path upstream from an acid gas removal (AGR) section. The fluid source includes a pressurized fluid. The system also includes a second fluid source configured to mix a second fluid with the first fluid to produce a fluid mixture. An expander is also disposed along the fluid path upstream from the AGR. The expander is configured to expand and condense the fluid mixture to produce mechanical energy, electrical power, or a combination thereof.

In a third embodiment, a system includes a flow path and a gasification section disposed along the flow path. The gasification section is configured to convert a feedstock into a syngas. The system also includes a scrubber disposed along the flow path downstream from the gasification section and configured to filter the syngas. The system additionally includes an expander disposed along the flow path downstream from the scrubber. The expander is configured to expand the filtered syngas. The system also includes an AGR section disposed along the flow path downstream from the expander and configured to remove an acid from the filtered syngas.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include a process for the production of power and/or chemicals from a carbonaceous fuel using a gasification process, in which "waste" energy is captured and used for providing additional power. In the gasification process, a carbonaceous fuel is partially oxidized by adding oxygen (or an oxygen-containing gas) to produce a syngas stream which includes carbon monoxide and hydrogen, as described in more detail below with respect to FIG. 1. The syngas stream may be further filtered or "scrubbed" by a scrubber in order to remove, for example, particulate matter and entrained solids. In certain of the embodiments described herein, the syngas stream may then enter an expander directly downstream of the scrubber. The syngas stream entering the expander may be termed as "untreated" syngas because the syngas has not undergone an acid gas removal process. The expander enables the capture of energy in the syngas stream that would have otherwise not been recaptured. More specifically, the syngas stream includes thermal energy and kinetic energy present in the mass flow of the syngas that would typically not have been recaptured. It is to be understood that the kinetic energy includes energy due to the mass effect (and flow) of the syngas, as well as the pressure in the syngas. For example, the syngas may have been cooled, loosing much of the thermal energy and slowing or stopping the syngas flow. Cooling and/or slowing the syngas may also reduce the pressure in the flow. The disclosed embodiments also may add water to the syngas before expanding the syngas, further increasing the mass in the flow of the syngas stream, with a corresponding increase in recaptured power. Indeed, "wet"

syngas may be used in the expander, containing water concentrations of approximately between 0.1% to 65% water by volume at the expander inlet.

In one embodiment, the syngas stream exiting downstream of the scrubber may be directed into a water gas shift reactor to convert the carbon monoxide and water into additional hydrogen and carbon dioxide. In this embodiment, the expander may be positioned directly downstream of the shift reactor instead of directly downstream of the scrubber. In yet another embodiment, the shift reactor may be positioned directly downstream of the expander. In this embodiment, the syngas stream is first expanded for the recovery of energy before undergoing the shift reaction. Indeed, one or more expanders may be positioned at various locations downstream of the scrubber, or downstream of other gasification plant components, such as an acid gas removal process, as described in more detail below. The expansion of the wet syngas enables the capture of energy that would have otherwise been lost by cooling the syngas, for example. Indeed, power production in gasification plants to make chemicals, including integrated gasification combined cycle (IGCC) gasification plants, may be improved by using the expander techniques disclosed herein. Further, lower capital costs, lower operating costs, and higher efficiencies may be achieved by recovery of otherwise wasted energy through direct expansion of the wet syngas.

Figure 1:
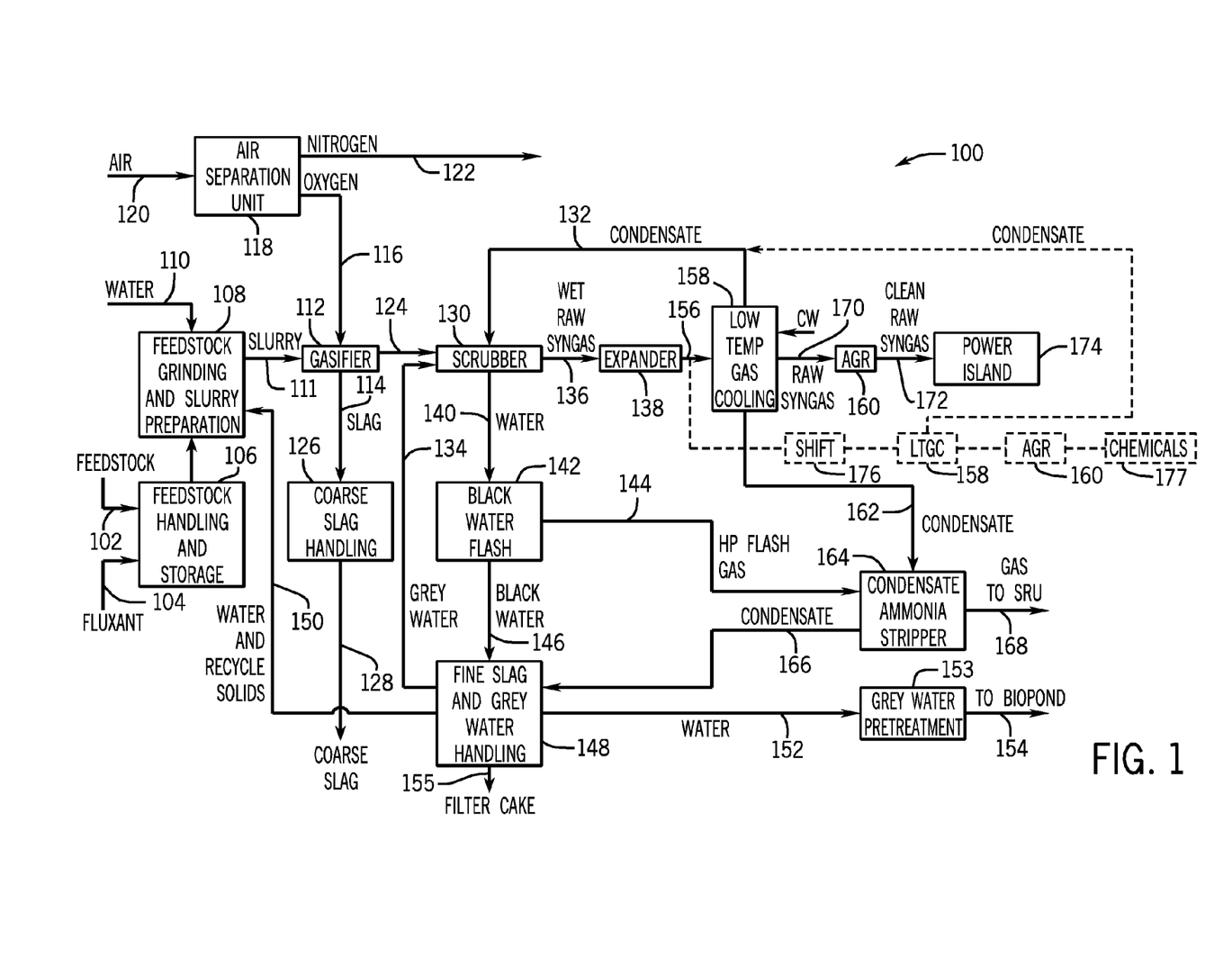
FIG. 1 illustrates an embodiment of a gasification system that includes an expander.

With the foregoing in mind, FIG. 1 depicts an embodiment of a gasification polygeneration plant 100 that may produce and/or burn a synthetic gas, i.e., syngas, for conversion into electricity and/or shift part of the syngas to make chemicals. It is to be understood that while the depicted embodiment is geared towards the production of electricity by using a power island 174, other embodiments may optionally not include the power island 174. For example, other plant 100 embodiments may include chemical plants, syngas production plants, or any other industrial plant suitable for the production of chemicals or chemical compositions based on syngas. A feedstock 102, such as a solid feed, that may be utilized as a source of energy for the gasification power plant 100. The feedstock 102 may include coal, petroleum coke, biomass, wood-based materials, agricultural wastes, tars, coke oven gas and asphalt, or other carbon containing items. The feedstock 102 and a fluxant 104 may be passed to a feedstock handling and storage unit 106. The fluxant 104 may be added to the feedstock 102 in the feedstock handling and storage unit 106 to adjust the melting behavior of the feedstock 102. The fluxant 104 may include, for example, sand, rock, limestone, bauxite, and iron ore. The feedstock handling and storage unit 106 may then direct the feedstock 102 and fluxant 104 mixture into a feedstock grinding and slurry preparation unit 108. The feedstock grinding and slurry preparation unit 108 may, for example, resize or reshape the feedstock 102 and fluxant 104 mixture by chopping, milling, shredding, pulverizing, briquetting, or palletizing the feedstock 102 and fluxant 104 mixture to generate gasification fuel. Additionally, water 110, or other suitable liquids may be added to the feedstock 102 and fluxant 104 mixture in the feedstock grinding and slurry preparation unit 108 to create a slurry fuel 111. The slurry fuel 111 may be conveyed into a gasifier 112 for use in gasification operations. It is to be noted that the feed used for gasification operations may include solid feed, liquid feed, and/or gas feeds.

The gasifier 112 may convert the fuel into a syngas, e.g., a combination of carbon monoxide and hydrogen. This conversion may be accomplished by subjecting the fuel to a controlled amount of any moderator and limited oxygen at elevated pressures (e.g., from approximately 40 bar-90 bar) and elevated temperatures (e.g., approximately 1200° C.-1500° C.), depending on the type of fuel used. The heating of the fuel during a pyrolysis process may generate a slag 114 and residue gases (e.g., carbon monoxide, hydrogen, and nitrogen).

A partial oxidation process (i.e., gasification) may then occur in the gasifier 112. To aid with this gasification process, oxygen 116 may be supplied to the gasifier 112 from an air separation unit (ASU) 118. The ASU 118 may operate to separate air 120 into component gases by, for example, distillation techniques that may be cryogenic or may utilize pressure swing adsorption (PSA). The ASU 118 may separate oxygen 116 from the air 120 supplied to it and may transfer the separated oxygen 116 to the gasifier 112. Additionally, the ASU 118 may separate nitrogen 122 from the air 120, for example, for collection or for further use in power generation.

Char and residue gases may react with the oxygen 116 to form carbon dioxide and carbon monoxide, which provides heat for the subsequent gasification reactions. The temperatures during the gasification process may range from approximately 1200° C. to approximately 1500° C. In addition, steam may be introduced into the gasifier 112. The gasifier 112 utilizes steam and limited oxygen 116 to allow some of the feedstock to be burned to produce carbon monoxide and energy, which may drive a second reaction that converts further feedstock to hydrogen and additional carbon dioxide.

In this way, a resultant syngas stream 124 is manufactured by the gasifier 112. This syngas stream 124 may include approximately 73% of carbon monoxide and hydrogen, as well as $CO_2$, $H_2O$, $CH_4$, HCl, HF, COS, $NH_3$, HCN, and $H_2S$ (based on the sulfur content of the feedstock). This resultant gas may be termed untreated syngas 124, since it contains, for example, $H_2S$. The gasifier 112 may also generate waste, such as the slag 114, which may be a wet ash material. This slag 114 may be conveyed to a coarse slag handling system 126. The coarse slag handling system 126 may produce a coarse slag 128 to be sold, for example, for use as road base or as another building material.

The syngas stream 124 may enter a scrubber 130 suitable for removing or "scrubbing" certain particulate matter and other pollutants. Any number of suitable scrubbing techniques may be used. For example, the scrubber 130 may use a water spray supplied with water from a condensate return 132 and a grey water return 134. The syngas stream 124 may contact the water spray, which condenses certain condensables such as tar and oil. The syngas stream 124 may also enter a water sump for removal of particulate matter. That is, the syngas stream 124 may be quenched in the water sump, resulting in a cleaning of the syngas stream 124. The syngas stream 124 may collect additional water mass in the scrubber 130. Indeed, the total mass flow of the syngas stream 124 may be increased by the addition of water mass in the scrubber 130. In one embodiment, a "wet" syngas 136 having increased water mass may then be directed into an expander 138 suitable for energy recovery through the expansion of the syngas stream 136. In certain embodiments, the syngas stream 136 leaving the scrubber 130 may include water concentrations of approximately between 0.1% to 65% water by volume, temperatures of approximately between 190° C. to 400° C., and pressures of approximately between 40 bar and 70 bar. In another embodiment, the water concentrations may be approximately zero. In this embodiment, the stream may be superheated prior to expansion. Indeed, water concentrations may vary from 0.1% to 65% water by volume.

The expander 138 may be a turbo expander (i.e., expansion turbine) suitable for converting a fluid flow (e.g., liquid or gas) into electric power. More specifically, the expander 138 may convert the mass flow and heat energy of the syngas stream 136 into rotational motion (i.e., mechanical energy) by using multiple blades or vanes disposed circumferentially on a shaft. The rotational motion of the shaft may then be converted into electrical power, for example, by using a generator. In certain embodiments, the generator may be included in the expander 138. In this way, the wet (or dry) syngas stream 136 may be used directly downstream of the scrubber 130 to generate additional electric power. An additional benefit of the expansion process includes cooling the syngas stream 136 for use in other processes downstream of the expander 138. Further, the expander 138 may condense a condensate, such as water, from the syngas. Indeed, in certain embodiments, the condensate condensed by the expander 138 may include 0.1% to 65% of the water present in syngas stream 136. It is to be noted that multiple expanders 138 may be used, and that the expander 138 may be placed in other locations in the plant 100. Indeed, in other embodiments described with respect to FIGS. 2-4 below, one or more expanders 138 may be disposed at other locations downstream of the gasifier 112. Further, in other embodiments, multiple gasifiers 112 may be manifolded or connected to direct syngas to a bank or multiple expanders 138. Indeed, one or more gasifiers 112 may "feed" one or more expanders 138.

Continuing with FIG. 1, the scrubber 130 may also produce a water 140 containing particulate matter removed from the syngas stream 124 during the scrubbing process. The water 140 may then be directed into a water flash system 142 for further processing. The water flash system 142 may expose the water 140 to a flash drum, in which the water 140 is flashed or vaporized into a high pressure flash gas 144, leaving behind a "black" water 146. The black water 146 includes a significant amount of the particulate matter and entrained solids removed during the scrubbing process. This black water 146 may then be directed into a fine slag and grey water handling system 148 for reuse. For example, the fine slag and grey water handling system 148 may process the black water 148 to recover solids and water 150 for reuse by the feedstock grinding and slurry preparation system 108 in the preparation of additional slurry fuel 111. The fine slag and grey water handling system 148 may also produce the grey water 134 suitable for reuse in the scrubbing process of the scrubber 130. Indeed, further plant efficiency is improved by reusing the water 134 in the scrubbing process as well as by reusing solids and water 150 in the feedstock preparation process. An excess water 152 may be directed to a grey water pretreatment system 153 for further processing. The grey water pretreatment system 153 may filter and clean the water 152, and direct a cleaned water 154 into a biopond for further filtration and reuse. A filter cake 155 may also be produced by the fine slag and grey water handling system 148, which may include non-reusable fine particulates, such as powdered ash.

Continuing with the syngas processing, a syngas stream 156 exiting downstream of the expander 138 may be further cooled by a low temperature gas cooling (LTGC) system 158 to temperatures of approximately between 50° C. to 150° C. In certain embodiments, other syngas processing may also include a carbonyl sulfide (COS) hydrolysis and a mercury removal process. For example, the syngas stream 156 may be cooled to near ambient temperatures by using condensing heat exchangers and associated knockout drums. The syngas stream 156 may then proceed to a reactor suitable for conversion of the COS into hydrogen sulfide ($H_2S$) to enable a more complete sulfur removable in an acid gas removal system (AGR) 160. Additionally, the syngas stream 156 may be transferred, for example, to carbon adsorption beds suitable for capturing mercury present in the syngas stream 156.

Additionally or alternatively, the syngas stream 156 may be transferred to a water gas shift system 176 so as to process the syngas stream 156 for the production of chemicals. The water gas shift system 176 enables an adjustment in the ratio of hydrogen to carbon monoxide in syngas. More specifically, the water gas shift system 176 may include a shift reactor suitable for performing a water gas shift reaction in which carbon monoxide reacts with water, (e.g. steam), to form carbon dioxide and hydrogen. The shifted syngas may then be cooled by a second LTGC system 158 as described above. The cooled syngas may then be transferred to a second AGR 160 for acid gas removal, and then to a chemical system 177 suitable for producing one or more chemicals from the syngas.

As the low temperature gas cooling system 158 cools the syngas stream 156, a significant portion of the water vapor in the stream 156 condenses. This condensate 132 may then be transferred for reuse by the scrubber 130 during scrubbing operations. An excess condensate 162 may be transferred for processing by a condensate ammonia stripper system 164 suitable for removing ammonia ($NH_3$) from the condensate. A substantially ammonia-free condensate 166 may then be directed into the fine slag and grey water handling system 148 for reuse in processing the water 146, as described above. Additionally, a sulfur-containing gas 168 produced during the ammonia stripping process may then be directed into a sulfur recovery unit (SRU) for further processing and sulfur removal.

After cooling by the low temperature gas cooling system 158, a cooled syngas stream 170 may be directed into the acid gas removal system (AGR) 160. The AGR 160 may then treat the syngas stream 170 to remove $H_2S$ and $CO_2$. For example, a physical solvent such as Selexol™ and/or a chemical solvent such as aqueous methyldiethanolamine (MDEA) may be used to remove the $H_2S$ and $CO_2$. A treated or "clean" syngas stream 172 may then be directed into a power system (e.g., power island) 174 for use in the generation of power, and/or for the production of chemicals. For example, the power system 174 may include a gas turbine suitable for using the syngas as a fuel and converting the fuel to rotational energy. The rotational energy may then be converted by a generator into electrical power. Indeed, the power plant 100 enables the conversion of syngas into electrical power while improving energy efficiency through the expansion of the syngas stream directly downstream of the scrubber 130. Additionally, other locations for the placement of the expander 138 may be used, as described in more detail below with respect to FIGS. 2-4.

Figure 2:
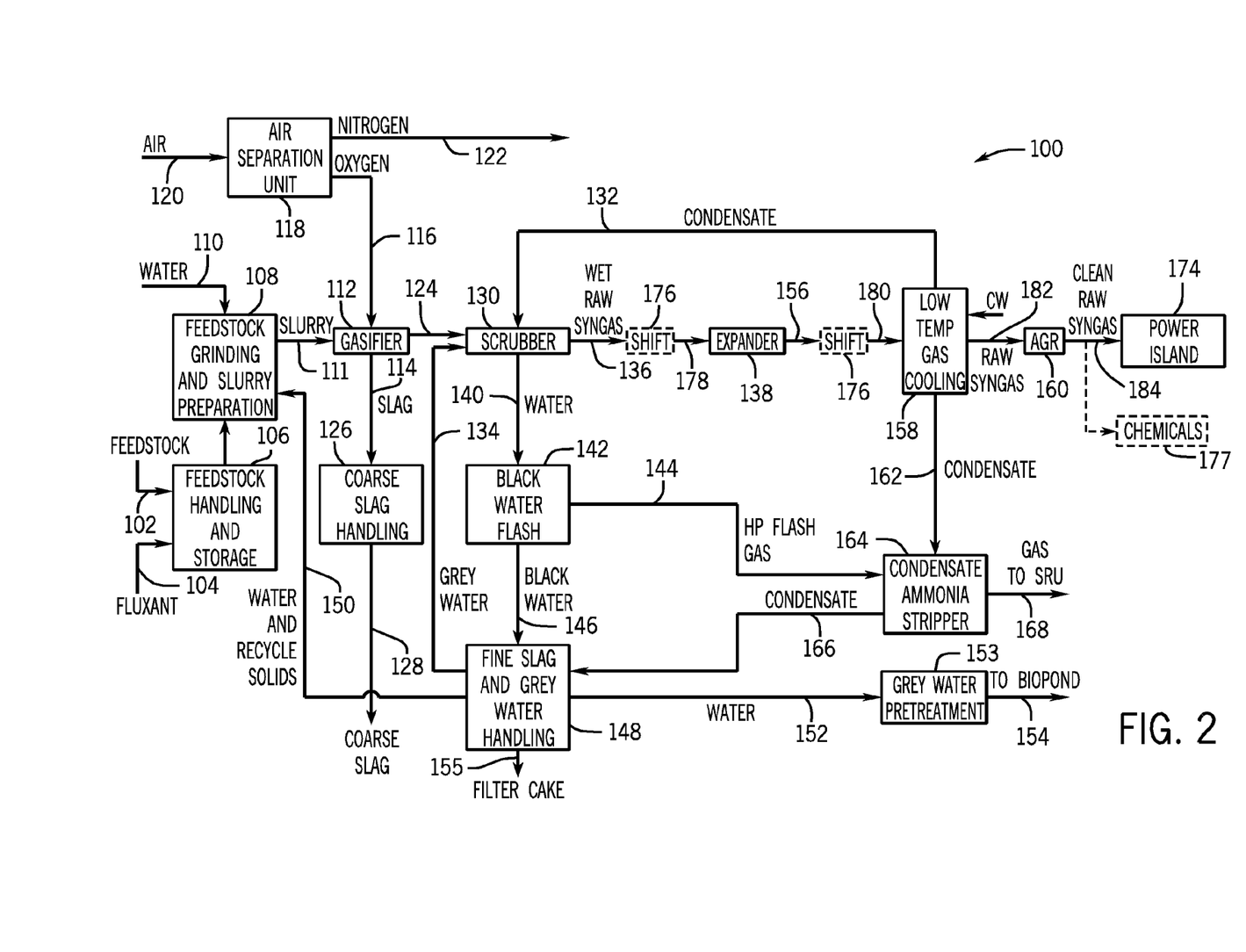
FIG. 2 illustrates an embodiment of a gasification system that includes an expander and a water gas shift system.

FIG. 2 illustrates certain embodiments of the gasification polygeneration plant 100 having the water gas shift system 176. In the illustrated embodiment, certain components described in detail above with reference to FIG. 1 are indicated with like element numbers. Similar to FIG. 1, the embodiment of FIG. 2 may also benefit from using the expander 138 for enhanced energy recovery. In the illustrated embodiment, the expander 138 may be located either directly downstream of the water gas shift system 176, or directly upstream or the water gas shift system 176. Indeed, using the expander 138 in combination with the water gas shift system 176 enables the capture of additional energy and enhances the production of electric power of the polygeneration plant 100.

The water gas shift system 176 enables an adjustment in the ratio of hydrogen to carbon monoxide in syngas. More specifically, the water gas shift system 176 may include a shift reactor suitable for performing a water gas shift reaction in which carbon monoxide reacts with water, (e.g. steam), to form carbon dioxide and hydrogen. This process may adjust the ratio of hydrogen to carbon monoxide in the syngas from approximately 1 to 1 to a shifted syngas that includes a ratio of hydrogen to carbon monoxide of approximately 3 to 1. It should be noted that, in the depicted embodiment, the water gas shift system 176 is a "sour" water gas shift system 176. That is, sulfur may be present in the syngas fed into the water gas shift system 176 during the water gas shift reaction.

In one embodiment, the syngas stream 136 is transferred directly into the water gas shift system 176. The water gas shift system 176 may then use a shift reactor to enable the re-adjustment of the syngas stream 136 composition to an approximate 3 to 1 ratio of hydrogen to carbon monoxide. The shift reaction is exothermic, and a syngas stream 178 exiting the water gas shift system 176 may be at a higher temperature than the syngas stream 136. For example, the temperature may have increased by approximately 50° C., 100° C., 400° C. The expander 138 may then expand the higher temperature syngas stream 178 and convert the flow and heat energy of the syngas stream 178 into mechanical energy. In turn, the mechanical energy may be converted into electrical power through the use of a generator. Indeed, the expander 138 may improve the overall production of energy in the polygeneration plant 100 by capturing the additional heat energy resulting from the water gas shift system 176 and producing additional electrical power.

In another embodiment, the water gas shift system 176 may be positioned downstream of the expander 138. In this embodiment, the expander 138 may first expand the syngas stream 136, as described above, before directing the expanded syngas stream 156 into the water gas shift system 176. The water gas shift system 176 may then employ a shift reaction to modify the ratio of hydrogen to carbon monoxide to an approximately 3 to 1 ratio. A shifted syngas stream 180 may then be processed by the low temperature gas cooling system 158, as described above, and transferred as a cooled syngas stream 182 to the AGR 160. The AGR 160 may process the cooled, shifted syngas stream 182 by removing $H_2S$ and $CO_2$ from the syngas stream 182, and then direct a treated syngas stream 184 into the power system 174. In embodiments that include the water gas shift system 176, the power system 174 may be modified to take advantage of the shifted hydrogen to carbon monoxide ratio of the syngas stream 184. For example, the power system 174 may include gas turbines suitable for using syngas having a higher hydrogen content. The power system 174 may then convert the shifted syngas stream 184 into electrical power. Additionally or alternatively, the chemical system 177 may process the syngas for the production of chemicals. Accordingly, the polygeneration plant 100 may increase power production by expanding the syngas before or after shifting the syngas.

Figure 3:
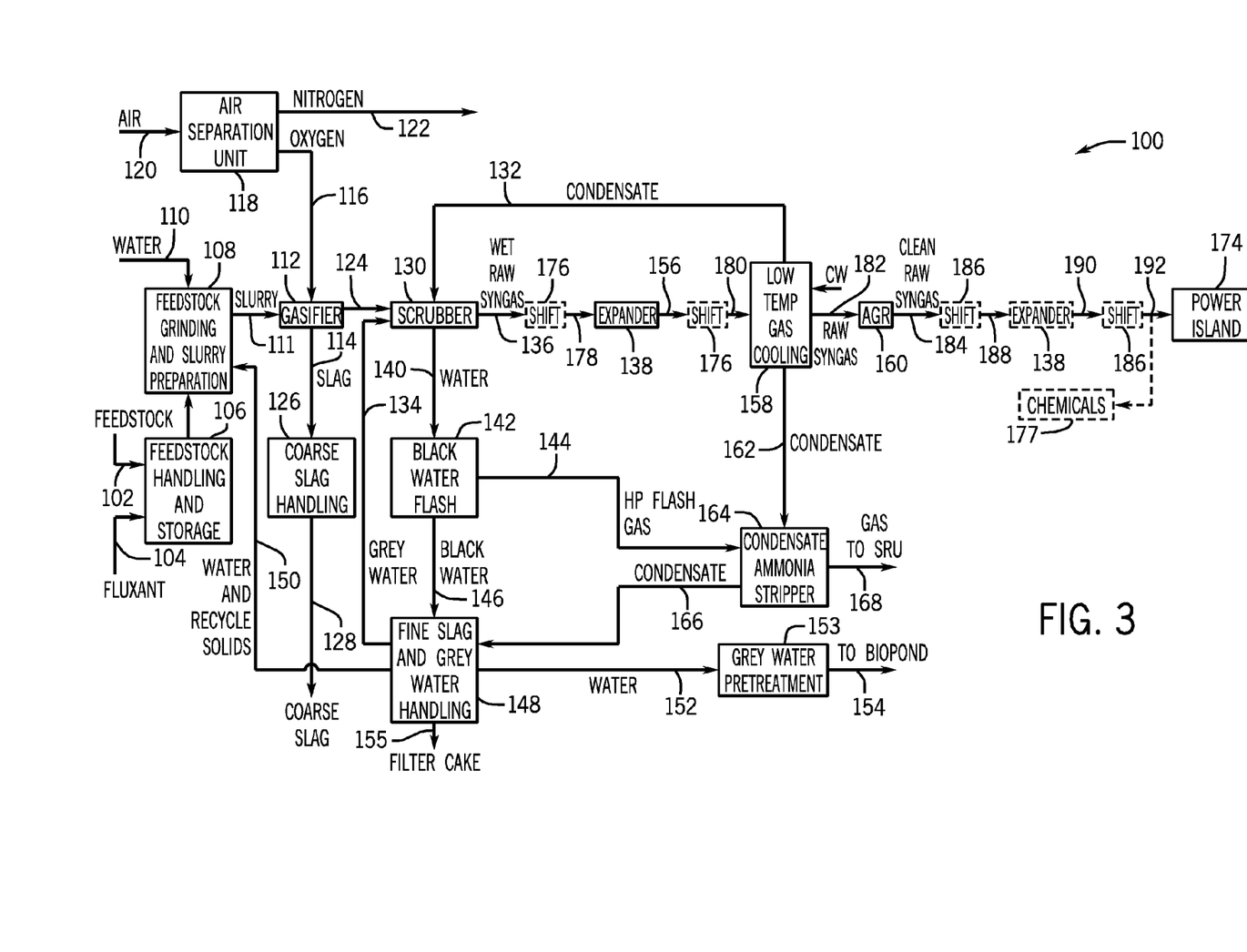
FIG. 3 illustrates an embodiment of a gasification system that includes multiple expanders.

FIG. 3 illustrates certain embodiments of the polygeneration plant 100, including the use of the expander 138 positioned downstream of the AGR 160. In the illustrated embodiment, certain components described in detail above with reference to FIG. 1 are indicated with like element numbers. Indeed, the expander 138 is suitable for expanding a syngas upstream of the AGR 160 and/or downstream of the AGR 160. By recapturing energy through the use of the expander 138 upstream and/or downstream of the AGR 160, the polygeneration plant 100 may improve efficiency and gain additional power output. The use of the expander 138 upstream of the AGR 160 has been described above with respect to FIGS. 1-2. The use of the expander 138 downstream of the AGR 160 is described in more detail below.

In one embodiment, the syngas stream 184 exits directly downstream of the AGR 160. The syngas stream 184 is a clean syngas stream, that is, sulfur has been removed from the syngas stream 184 by the AGR 160. In this embodiment, the syngas stream 184 may then be directed into the water gas shift system 186. The water gas shift system 186 may be suitable for adjusting the ratio of hydrogen to carbon monoxide in syngas having a reduced sulfur content. For example, chromium, or copper-based catalysts may be used, suitable for enabling the conversion of carbon monoxide and water into hydrogen and carbon dioxide. The shift reaction enabled by the water gas shift system 186 is a "sweet" shift reaction due to the reduced content of sulfur in the syngas 184. The sweet shift reaction is exothermic, and the thermal energy resulting from the reaction may be captured, for example, by placing the expander 138 directly downstream of the water gas shift system 186. In this embodiment, the heat added to the mass flow of a syngas stream 188 may be converted by the expander 138 positioned directly downstream of the water gas shift system 186 into electrical energy. As mentioned above, the expander 138 may convert the energy present in the mass flow of the syngas 188 into rotational motion, which may then be used to drive a generator suitable for producing additional electric power.

In another embodiment, the stream 184 exiting downstream of the AGR 160 may be transferred directly into the expander 138. In this embodiment, the expander 138 expands the syngas stream 184 and directs and expanded syngas stream 190 into the water gas shift system 186. During expansion in the expander 138, the syngas may transform heat energy into mechanical energy. Accordingly, the syngas stream 190 may be cooler than the syngas stream 188. The cooler syngas stream 190 may then be directed into the water gas shift system 186 for further processing. In this embodiment, the water gas shift system 186 may advantageously use the cooler syngas by using a low temperature shift reaction, such as a shift reaction incorporating a copper-zinc-aluminum catalyst composition. As mentioned earlier, the shift reaction will result in a syngas having a higher hydrogen ratio. Accordingly, a shifted syngas stream 192 (or syngas stream 190), may be conveyed into the power system 174 for use as fuel. Additionally or alternatively, the syngas stream 192 may be directed into the chemical system 177 for the production of chemicals. The use of the expander 138 downstream of the AGR 160 allows for recapture of energy that would have been otherwise not used. For example, additional heat resulting from the water gas shift system 186 may be used by the expander 138 to produce electricity. Indeed, other embodiments of the polygeneration plant 100, such as integrated gasification combined cycle (IGCC) embodiments described in more detail in FIG. 4 below, may use the expander 138 to improve plant efficiency and enable the production of additional electric power.

Figure 4:
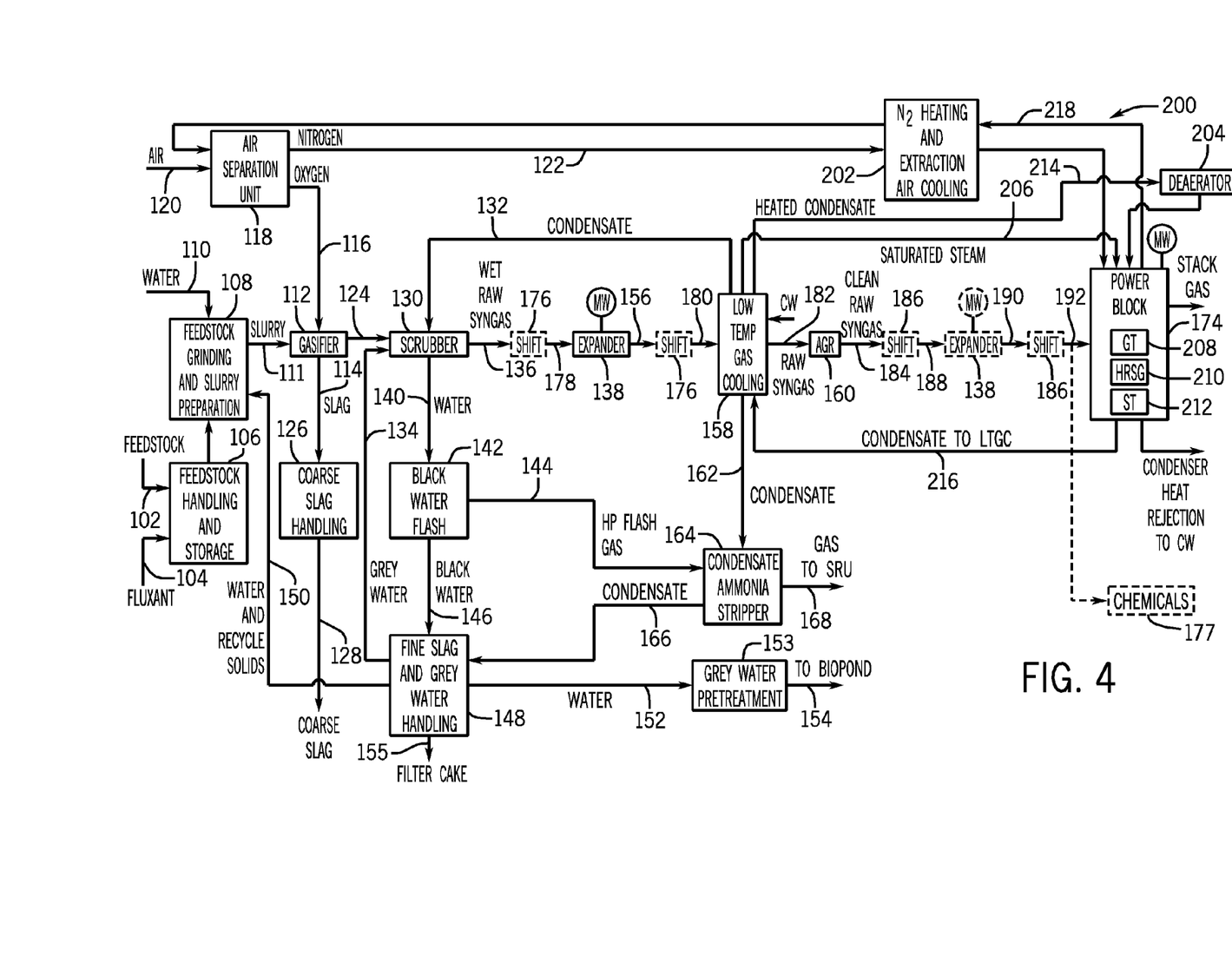
FIG. 4 illustrates an embodiment of a polygeneration system that includes an integrated gasification combined cycle (IGGC) system and an expander.

FIG. 4 depicts an embodiment of an IGCC power plant 200 that may also include production of chemicals (a polygeneration plant) with one or more expanders 138 suitable for improving the production of electric power. In the illustrated embodiment, certain components described in detail above with reference to FIG. 1 are indicated with like element numbers. As mentioned above with respect to FIGS. 1-3, the expander 138 converts the energy present in the flow of syngas into electrical power. Further, the depicted embodiment includes certain systems, such as a nitrogen heating and extraction air cooling system 202, and a deaerator 204, suitable for incorporating IGCC techniques with the use of expanders 138. In combined cycle power plants, such as the IGCC power plant 200, additional energy efficiencies may be gained, for example, by reusing saturated steam 206 generated by the low temperature gas cooling system 158 as described below.

In one embodiment, the expander 138 is disposed directly downstream of the scrubber 132 and used to convert the syngas stream 136 into additional electric power. In another embodiment, the water gas shift system 176 is placed directly downstream of the scrubber 132, and the expander 138 is disposed directly downstream of the water gas shift system 176. In this embodiment, the shifted syngas stream 178 is expanded and converted into electric power. The expanded syngas stream 156 (or the expanded syngas stream 180) may then be directed into the low temperature gas cooling system 158. Additionally or alternatively, the expander 138 may be disposed downstream of the water gas shift system 186, as depicted. Indeed, the expander 138 may be disposed upstream and/or downstream of the AGR 160, and use the mass flow energy present in the syngas stream 184 (or the syngas stream 188) to produce additional electric power.

In the depicted IGCC embodiment that may also include production of chemicals, the low temperature gas cooling system 158 may cool the syngas and produce the saturated steam 206 during the cooling process. This saturated steam 206 may then be directed into the power system 174 for further reuse. Indeed, the power system 174 may include, for example, a gas turbine 208, a heat recovery steam generator (HRSG) system 210 and a steam turbine 212. The gas turbine 208 may use the syngas as a fuel to drive a first load, such as an electrical generator suitable for producing electric power. The steam turbine engine 212 may then drive a second load, such as a second electrical generator. In addition, although the gas turbine 208 and steam turbine 212 may drive separate loads, the gas turbine engine 208 and steam turbine engine 212 may also be utilized in tandem to drive a single load via a single shaft. The specific configuration of the steam turbine engine 212, as well as the gas turbine engine 208, may be implementation-specific and may include any combination of sections.

Heated nitrogen from the nitrogen heating and extraction air cooling system 202 may be directed into the power system 174 for use as a combustion diluent in the gas turbine 208, thereby improving gas turbine efficiency. Heated exhaust gas from the gas turbine engine 208 may be transported into the HRSG 210 and used to heat water and produce steam used to power the steam turbine engine. Some of the water in the HRSG 210 may have been provided by the deaerator 204. That is, the deaerator 204 may remove certain gases (e.g., oxygen) from a heated condensate 214 return exiting the low temperature gas cooling system 158, and provide water to the power system 174. Additionally, saturated steam 206 from the low temperature gas cooling system 158 may also be used to drive the steam turbine, after it is superheated in the HRSG 210.

Indeed, in combined cycle power plants such as IGCC power plant 200, hot exhaust may flow from the gas turbine engine 208 and pass to the HRSG 210, where it may be used to generate high-pressure, high-temperature steam. The steam produced by the HRSG 210 may then be passed through the steam turbine engine 212 for power generation. In addition, the produced steam may also be supplied to any other processes where steam may be used, such as to the gasifier 112. Additional reuse efficiencies are possible, such as reusing a condensate 216 resulting from power system 174 operations. The condensate 216 may be directed to the low temperature gas cooling system 158 for use in cooling operations. Likewise, an air 218 extracted during gas turbine operations may be processed by the system 202 and directed into the ASU 118 for separation into nitrogen and oxygen. The gas turbine engine 208 generation cycle is often referred to as the "topping cycle," whereas the steam turbine engine 212 generation cycle is often referred to as the "bottoming cycle." By combining these two cycles with the use of the expanders 138, the IGCC power plant 200 may lead to greater efficiencies in both cycles.

Technical effects of the invention include improved gasification efficiency and power production through the use of one or more expanders suitable for converting a syngas flow into electrical power. The expanders may be positioned at various locations in a gasification plant, including locations directly downstream of a scrubber. Further, the expanders may be used in various types of gasification polygeneration plants, including IGCC power plants. Additionally, the syngas stream may include a "wet" syngas stream. Indeed, the syngas stream may include water added to the syngas before acid gas removal. By using one or more expanders to capture energy that would have been otherwise not used, the disclosed embodiments enable a more efficient gasification plant having increased power output.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a flow path;
a gasification section disposed along the flow path and configured to convert a feedstock into a syngas;
a scrubber disposed directly downstream of the gasification section and configured to filter the syngas; and
a first turbo expander disposed along the flow path directly downstream from the scrubber and configured to expand the syngas, wherein the syngas comprises an untreated syngas, and wherein the first turbo expander is configured to generate mechanical energy, electrical power, or a combination thereof, via expansion of the syngas; and wherein an acid gas removal (AGR) section is disposed along the flow path downstream from the first expander, wherein the AGR section is configured to treat the untreated syngas to remove an acid gas and produce a treated syngas.

2. The system of claim 1, wherein the system is configured to add a water mass to the untreated syngas.

3. The system of claim 2, wherein the system is configured to add a water mass to the untreated syngas upstream of the first turbo expander.

4. The system of claim 2, wherein the system is configured to add a water mass by saturating the water mass into the untreated syngas.

5. The system of claim 2, wherein the water mass comprises a heated water mass.

6. The system of claim 1, wherein the untreated syngas comprises a wet syngas having at least approximately 0.1% to 65% $H_2O$.

7. The system of claim 1, wherein the untreated syngas is left thermally unmodified prior to expansion by the first turbo expander.

8. The system of claim 7, wherein the first turbo expander is configured to condense a substance from the untreated syngas.

9. The system of claim 8, wherein the substance comprises a condensate having approximately 0.1% to 65% $H_2O$ condensed from the untreated syngas.

10. The system of claim 1, wherein the gasification section comprises an integrated gasification combined cycle (IGCC) gasification section.

11. The system of claim 1, comprising a second turbo expander disposed along the flow path downstream from the AGR section and configured to expand the treated syngas.

12. The system of claim 1, comprising a second turbo expander disposed along the flow path downstream from the first expander and configured to expand the syngas.

13. A system, comprising:
- a flow path;
- a gasification section disposed along the flow path and configured to convert a feedstock into a syngas;
- a scrubber disposed along the flow path downstream from the gasification section and configured to filter the syngas;
- a turbo expander disposed along the flow path downstream from the scrubber and configured to expand the filtered syngas, wherein the filtered syngas is left thermally unmodified prior to expansion by the turbo expander; and
- an acid gas removal (AGR) section disposed along the flow path downstream from the expander and configured to remove an acid from the filtered syngas.

14. The system of claim 13, wherein a fluid is mixed with the syngas prior to the expansion of the syngas.

15. The system of claim 14, wherein the fluid comprises water.

* * * * *